United States Patent [19]
Bertrand et al.

[11] 3,974,970
[45] Aug. 17, 1976

[54] FORAGE HARVESTER CUTTERHEAD

[75] Inventors: Raymond Bertrand; Jean Tenaud; Rene Grabowski, all of Senonches, France

[73] Assignee: Deere & Company, Moline, Ill.

[22] Filed: Sept. 4, 1975

[21] Appl. No.: 610,309

[30] Foreign Application Priority Data
Oct. 16, 1974 France .................... 74.34747

[52] U.S. Cl. .................... 241/222; 56/13.9; 241/294
[51] Int. Cl.² .................... B02C 18/18
[58] Field of Search .......... 241/220, 221, 222, 242, 241/292.1, 293, 294; 56/13.9

[56] References Cited
UNITED STATES PATENTS

| | | | |
|---|---|---|---|
| 1,155,353 | 10/1915 | Haldeman | 241/222 UX |
| 1,213,192 | 1/1917 | Heebner | 241/222 X |
| 2,309,594 | 1/1943 | Hutchings | 241/294 X |
| 3,357,467 | 12/1967 | Morkoski | 241/220 X |
| 3,452,796 | 7/1969 | Hennen | 241/220 X |

FOREIGN PATENTS OR APPLICATIONS
175,778   12/1965   U.S.S.R. .................... 241/221

*Primary Examiner*—Granville Y. Custer, Jr.
*Assistant Examiner*—Howard N. Goldberg

[57] ABSTRACT

A cut-and-throw type forage harvester has a rotatable cutterhead including a plurality of knives having cutting edges that generate a cylinder as the cutterhead rotates. The cutterhead is mounted in a housing having an upwardly directed tangential discharge chute, which has parallel front and rear walls and converging side walls to narrow the stream of crop material discharged from the cutterhead for movement through an upwardly and rearwardly extending discharge spout or upper chute portion. The knives are mounted on the cutterhead so that their cutting edges diverge from the central portion of the knife in a forward direction relative to the direction of rotation of the cutterhead, so that the crop material impelled in a direction normal to the cutting edges is converged in the discharge chute to reduce the amount of impingement of the crop material on the converging side walls of the discharge chute.

4 Claims, 6 Drawing Figures

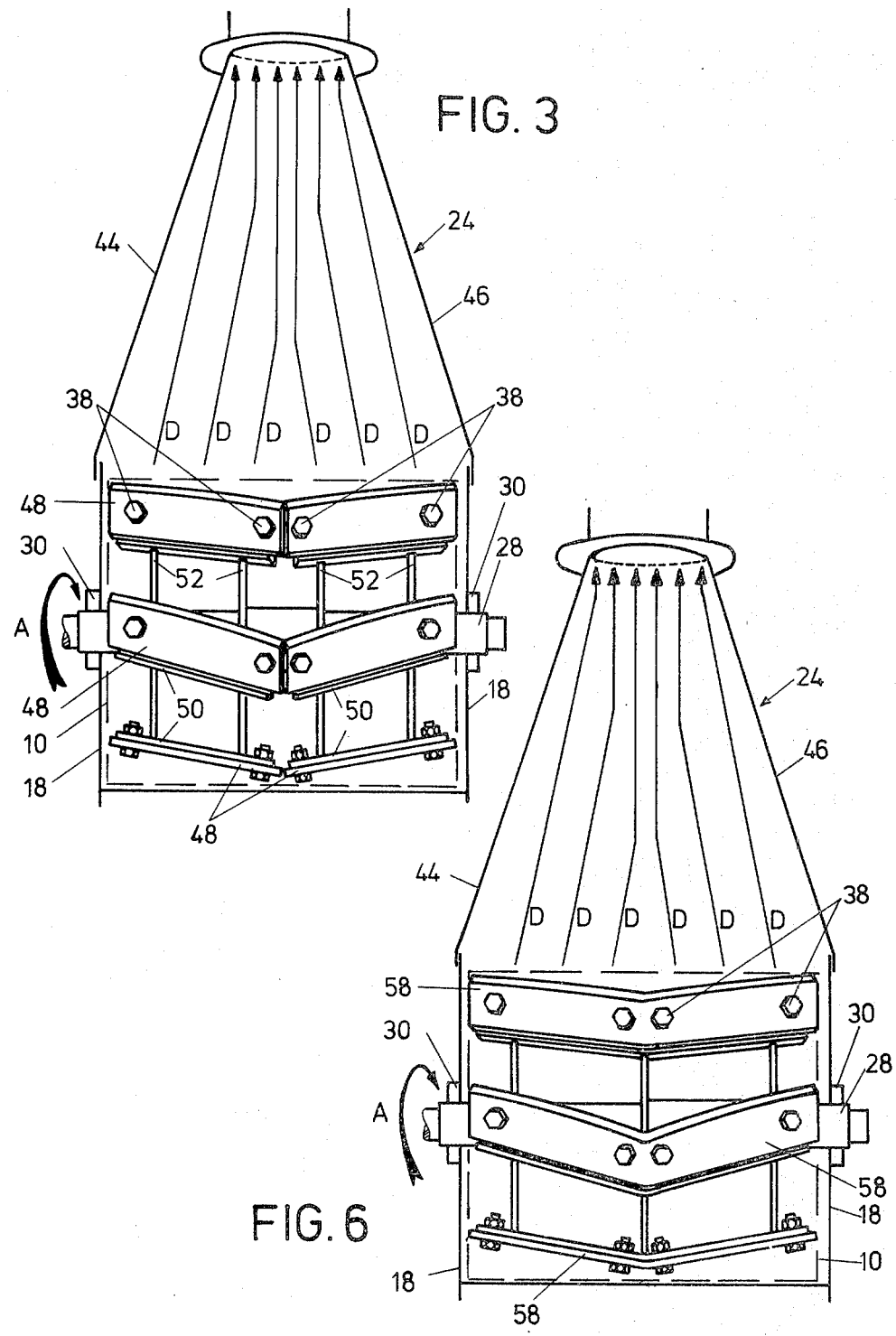

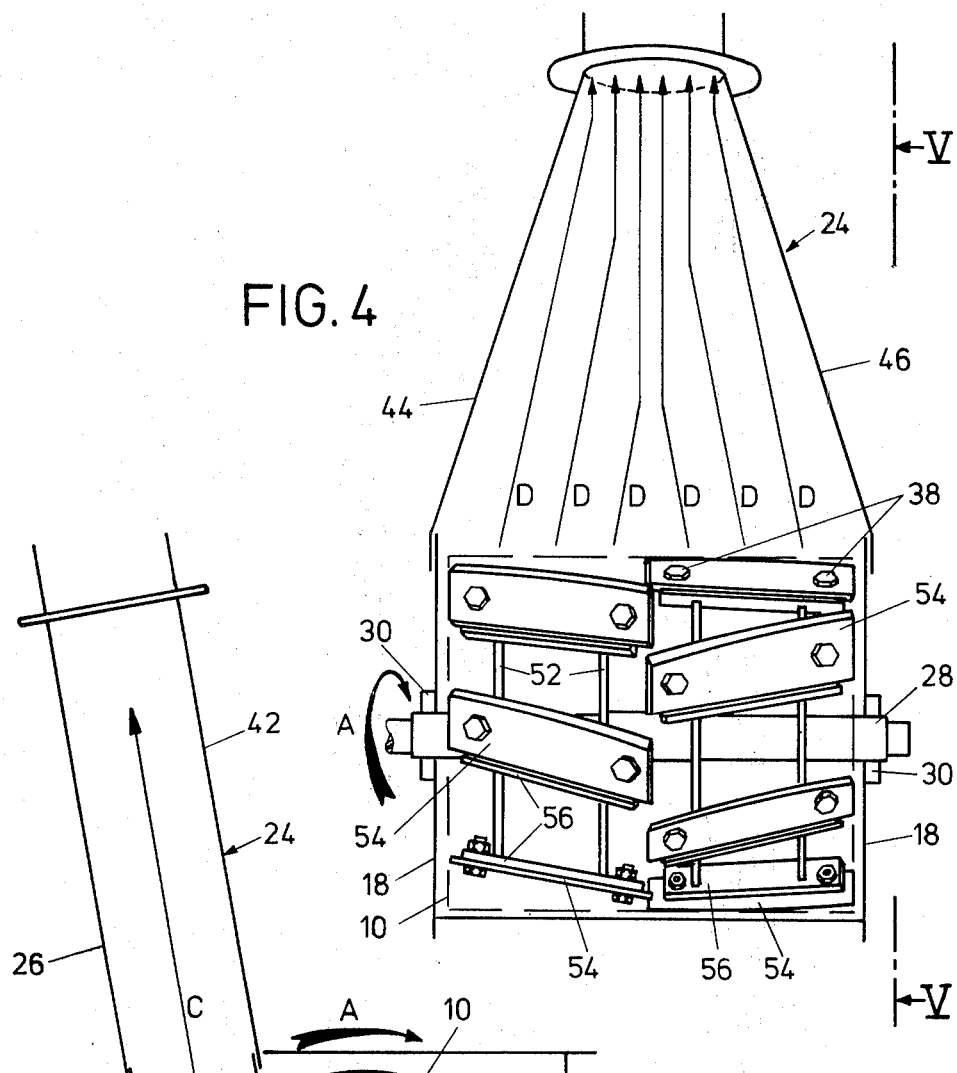
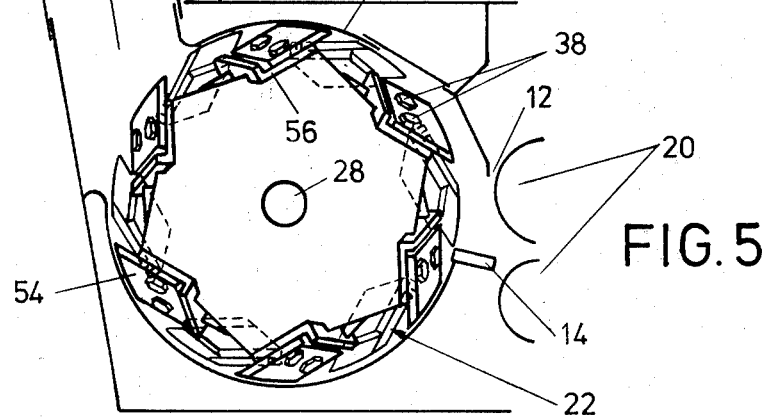

FORAGE HARVESTER CUTTERHEAD

BACKGROUND OF THE INVENTION

This invention relates to an improved reel or cylinder type cutterhead for a cut-and-throw type forage harvester.

As is well known, a cut-and-throw type forage harvester conventionally utilizes a cylinder type cutterhead, which reduces the crop as it is fed radially inwardly to the cutterhead over a shear bar and then propels the reduced crop upwardly through a tangential outlet. The outlet, of course, spans the width of the cutterhead and conventionally communicates with a discharge chute, the lower end of which has upwardly converging side walls so that the crop is narrowed into a stream that is substantially narrower than the width of the cutterhead, the momentum of the crop carrying it upwardly and then rearwardly through an arcuate discharge spout or upper chute portion for discharging into a trailing vehicle. A forage harvester of the above general type is shown in U.S. Pat. No. 3,452,796, also assigned to the assignee herein. The cut-and-throw type machine is obviously more economical than a machine that utilizes a separate blower for impelling the reduced crop through the discharge spout, although in certain crops and crop conditions, there is sometimes a problem in providing sufficient momentum for the reduced crop by means of the cutterhead to adequately discharge it into the collecting vehicle. This problem is complicated by the fact that the crop material must necessarily impinge on the converging side walls of the lower end of the discharge chute, which reduces the momentum of the crop material.

SUMMARY OF THE INVENTION

According to the present invention, there is provided an improved cutterhead of the above general type, wherein the knives are arranged to reduce the impingement of the crop material on the converging side walls of the discharge chute and thereby improve the discharge of the reduced crop material. More specifically, the cutterhead knives are provided so that the cutting edges diverge from a central portion of the cutterhead toward the opposite sides of the cutterhead in the direction of cutterhead rotation, so that the crop material that is impelled at an approximately 90° angle from the cutting edges is converged as it enters into the discharge chute without impinging on the converging side walls of the discharge chute. Still more specifically, the knives are mounted so they form a V-shaped or chevron shaped cutting edge.

BRIEF DESCRIPTION OF THE DRAWINGS

FIG. 3 is a similar view to that of FIG. 1 but of a first embodiment of a forage harvester cutterhead assembly according to the invention, the side elevational view thereof being similar to FIG. 2;

FIG. 4 is a similar view to that of FIG. 1 but of a second embodiment of a forage harvester cutterhead assembly of the invention;

FIG. 5 is a similar view to that of FIG. 2 but of the second embodiment shown in FIG. 4 taken on the line V—V thereof;

FIG. 6 is a similar view to that of FIG. 1 but of a third embodiment of a forage harvester cutterhead assembly according to the invention, the side elevational view being identical with FIG. 2.

In the figures similar parts have similar reference numerals.

DESCRIPTION OF THE PREFERRED EMBODIMENTS

Figures 1, 2:
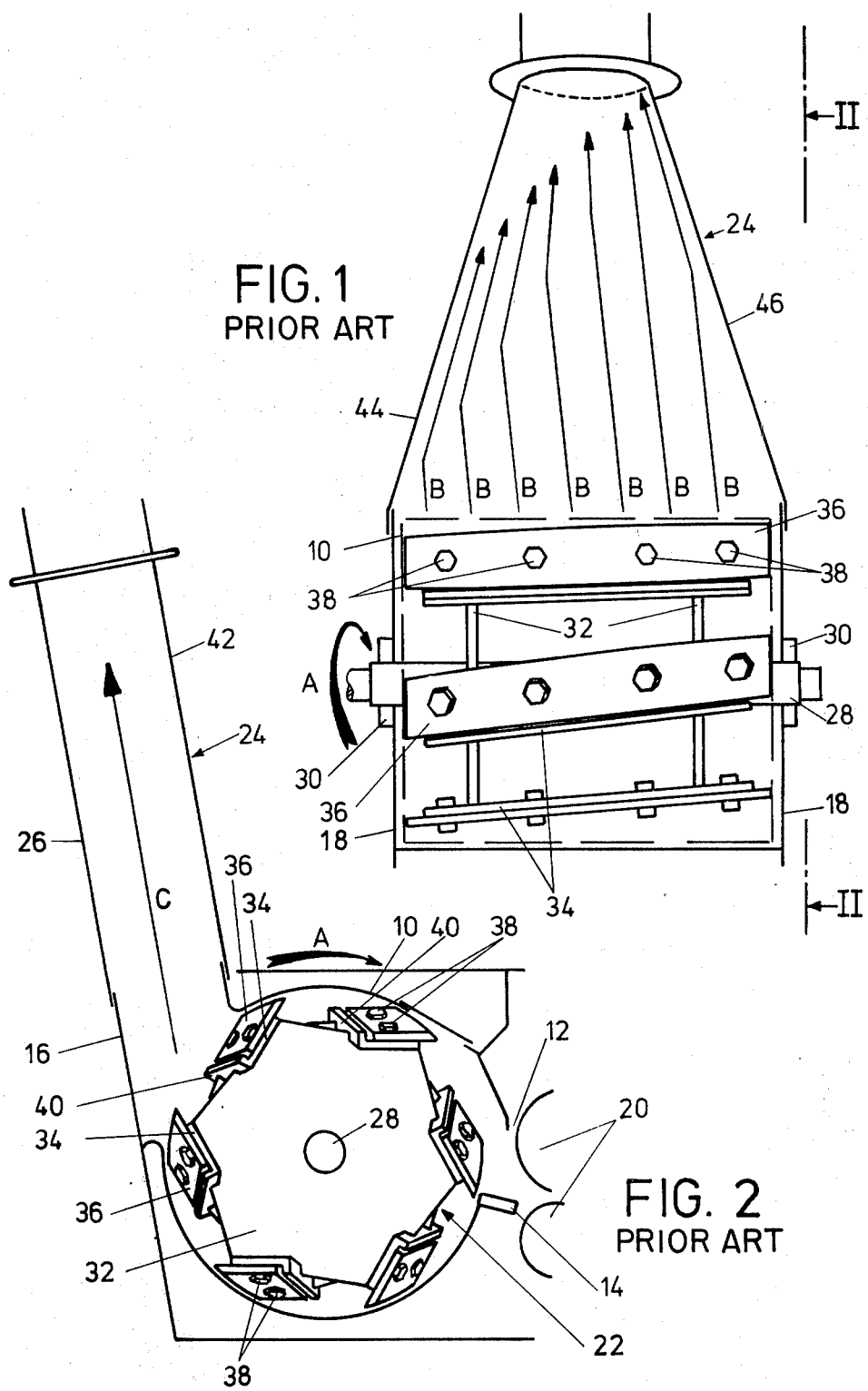
FIG. 1 is a schematic rear elevational view of a portion of a forage harvester with outer rear portions of the housing broken away to show a conventional forage harvester cutterhead assembly and the direction of flow of forage therefrom.
FIG. 2 is a schematic side elevational view on the line II—II of FIG. 1, with outer side portions of the housing broken away, of the assembly of FIG. 1 and indicating the direction of flow of forage.

The forage harvester in which the above cutterhead assemblies are mounted in conventional (apart from the assemblies) and therefore will be described only in broad outline. The forage harvester has a mobile main frame, and is mounted on a pair of wheels. The main frame includes a forwardly extending draw bar which is connectible to a tractor in a conventional manner, the harvester being powered from the tractor PTO by a fore-and-aft extending drive shaft.

Turning now to the drawings a cutterhead housing 10 which is shown only in part, is mounted on the right side of the frame and has a forward inlet opening 12 of which the lower extremity is defined by a transversely extending shear bar 14. The rear portion of the housing 10 is formed by a removable upwardly extending inspection cover 16, and the sides by vertical plates 18. Two pairs of axially transverse cooperating feed rolls 20 of which only a rear pair is shown are mounted in a feed roll housing (not shown) immediately in front of the cutterhead housing 10, and a harvesting attachment (also not shown) for removing crop from the field and delivering it to the feed rolls 20, is mountable on the front of the feed roll housing in a conventional way. The crop passes from the harvesting attachment to the pairs of rolls 20 which deliver it rearwardly through the inlet opening 12 over the shear bar 14 in a generally radial direction into a rotating cylinder- or reel-type cutterhead indicated in its entirety by the numeral 22. The cutterhead 22 reduces the crop as it passes over the shear bar 14 and impels it rearwardly to, and up, an upwardly extending discharge chute 24 a lower portion only of which is shown and which has a rear wall 26 to the bottom of which the inspection cover is attached. The chute 24, in turn, delivers the reduced crop to a trailing collector vehicle.

The cutterhead 22 includes an axial shaft 28 which is journalled in a bearing 30 on each of the side plates 18 and which is connected to the fore-and-aft extending drive shaft (not shown) through a known type of drive mechanism (also not shown) and is driven thereby in a clockwise direction as viewed in, for example, FIG. 2 as indicated by an arrow A in that figure. A pair of flat approximately hexagonal spaced-apart flanges 32 are mounted on the cutterhead shaft 28 and carry at their peripheries supports 34 on their six sides for six knives 36 (although the chosen number of knives and their supports can be varied). The supports 34 extend across the cutterhead 22 at a small angle, i.e. about 10°, to the cutterhead axis, the knives 36 being attached to radially-outer faces of the supports 34 by bolts 38. Each support 34 has an upturned portion 40 through which an adjusting screw (not shown) passes to abut the edge, of the associated knife 36 which is parallel to the cutting edge. The knives 36, when rotating, are thus arranged to trace a cylinder the diameter of which can be altered by movement of the adjusting screws after loosening the bolts 38.

The angling of the knives 36 is essential so that the cutting loads on the knives are reasonably continuous. If the knives 36 were simply parallel to the axis then the crop along the length of the shear bar would be cut simultaneously and the loadings on the knives would be high and intermittent. The cutting edge of each knife is slightly arcuate in a convex manner in the lengthwise direction.

The lower portion of the discharge chute 24 has a front wall 42 which is parallel to the rear wall 26 thereof in side view, but both walls 26, 42 converge from their bases to their tops when viewed from the rear or the front. The lower portion is completed by side walls 44, 46. The forage is impelled into the discharge chute 24 along a path which is approximately at right angles to the knives 36. Consequently the forage follows a course indicated by arrows B in FIG. 1 and by arrow C in FIG. 2. It will be observed that, although the arrow C is parallel to the walls 26 and 42, a significant proportion of the arrows B are directed toward the side walls 44 and 46 and therefore some of the forage will impinge on the side walls 44 and 46, losing momentum initially imparted to it by the rotating knives 36 and consequently the efficiency of the "throw" of the cutterhead is reduced.

In the first embodiment of the invention, which is shown in FIG. 3, impingement on the side walls 44 and 46 is lessened by replacing each knife 36 of the conventional cutterhead assembly of FIG. 1 by a pair of knives 48 which are angled to the cutterhead axis. The inner ends of each pair are aligned and in contact with each other and the knives 48 of the pair diverge therefrom, when looking from the rear as in FIG. 3, so that the two have an angle of approximately 150° therebetween. The blades of the knives 48 are slightly arcuate in a lengthwise direction in a similar fashion to the knives 36 of the conventional assembly. Each knife 48 is mounted on a support 50 similar to the supports 32, and the supports 50 are in turn each mounted on a pair of flanges 52 which are similar to the flanges 32 and which are spaced apart on the axial shaft 28.

Again, the forage will leave the knives in a path approximately at right angles thereto, but due to the mutual angling of the knives 48 of each pair, the path followed is that of arrows D. Consequently, as can clearly be seen from FIG. 3, impingement of forage on the side walls 44, 46 is significantly reduced when compared with the conventional assembly of FIG. 1.

The cutterhead assembly of FIGS. 4 and 5 achieves a similar result. Here the ends of pairs of knives 54 do not contact each other, but the knives are in staggered array making similar angles to the cutterhead axis as do the knives 48. The knives 54 also have supports 56 similar to the supports 50.

In the third embodiment, shown in FIG. 6, each pair of knives 48 in the first embodiment is replaced by a single V-shaped knife, the angle of the V again being about 150°, and the resultant reduction of forage impingement on the side walls 44 and 46 being similar. The knives 58 are also mounted in the same manner as the knives 48.

We claim:
1. A cut-and-throw type forage harvester having a rotatable cutterhead with a plurality of knives mounted thereon and having cutting edges generating a cylinder as the cutterhead rotates, the cutterhead being mounted in a housing having generally upright side walls and an upwardly directed tangential outlet communicating with an upwardly extending discharge chute having converging side walls extending upwardly from the housing side walls to a narrowed outlet with a lesser width than the width of the cutterhead housing between the housing side walls, characterized in that the cutting edges of the knives diverge from a central portion of the cutterhead in the direction of cutterhead rotation so that crop material impelled by the knives in a direction perpendicular to the cutting edge through the housing outlet is converged toward a central portion of the discharge chute to reduce the impingement of the material on the converging side walls of the discharge chute.

2. The invention defined in claim 1 and further characterized in that each knife spans the width of the cutterhead and has a V-shaped cutting edge.

3. The invention defined in claim 1 and further characterized in that the knives are mounted in pairs in end to end relationship, each pair spanning the width of the cutterhead and forming a substantially V-shaped cutting edge.

4. The invention defined in claim 1 and further characterized in that the knives are mounted in pairs in approximate end to end relationship so that each pair spans the width of the cutterhead, the inner ends of the knives in each pair being staggered in a circumferential direction.

* * * * *